United States Patent

Kawabe et al.

[11] Patent Number: 5,154,999
[45] Date of Patent: Oct. 13, 1992

[54] RESIN BINDER FOR TONER COMPOSITION

[75] Inventors: Kuniyasu Kawabe; Norihiro Hayashi; Shinichiro Yasuda, all of Wakayama, Japan

[73] Assignee: Kao Corporation, Tokyo, Japan

[21] Appl. No.: 204,953

[22] Filed: Jun. 9, 1988

Related U.S. Application Data

[60] Continuation of Ser. No. 908,905, Sep. 18, 1986, abandoned, which is a division of Ser. No. 800,268, Nov. 21, 1985, abandoned.

[30] Foreign Application Priority Data

Nov. 22, 1984 [JP] Japan ............................. 59-247633
Nov. 22, 1984 [JP] Japan ............................. 59-247634

[51] Int. Cl.$^5$ ..................... G03G 9/00; C08K 3/10
[52] U.S. Cl. ...................... 430/109; 430/105; 524/435
[58] Field of Search ............... 524/435; 430/109, 105

[56] References Cited

U.S. PATENT DOCUMENTS 3,442,873 5/1969 Nesta .................................. 526/273
4,302,562 11/1981 Becha et al. ....................... 526/273
4,304,695 12/1981 Hohlein et al. .................... 526/273
4,362,803 12/1982 Miyakawa et al. ............... 430/106.6

FOREIGN PATENT DOCUMENTS 57-185047 2/1983 Japan.

Primary Examiner—Thurman K. Page
Assistant Examiner—Peter F. Kulkosky
Attorney, Agent, or Firm—Birch, Stewart, Kolasch & Birch

[57] ABSTRACT

A novel resin is produced by the step of polymerizing (a) styrene and/or a derivative thereof, (b) a monomer component selected, alone or in combination of two or more, from the group consisting of methacrylic acid, acrylic acid, a methacrylic ester and an acrylic ester, and (c) 0.05 to 10 percent by weight, based on the total weight of the monomers, of a polybasic acid having 7 to 40 carbon atoms, an anhydride thereof or a lower (C1 to C6) alkyl ester thereof, the monomer component (b) containing at least one acrylic or methacrylic ester having hydroxyl or epoxy group in at least equimolar amount to the component (c) and has a softening point of 100° to 160° C. and a glass transition temperature of 50° C. or higher. It is useful as a binder resin for a toner composition.

6 Claims, No Drawings

RESIN BINDER FOR TONER COMPOSITION

This application is a continuation of application Ser. No. 908,905 filed on Sep. 18, 1986, now abandoned, which is a divisional of application Ser. No. 800,268 filed on Nov. 21, 1985, now abandoned.

The invention relates to a novel resin, a process for producing the same and use of the resin as a binder for a toner composition in the electrophotography, the electrostatic recording method and the electrostatic printing method.

STATEMENT OF PRIOR ARTS

Conventional electrophotographic processes comprise uniformly charging a photoconductive insulating layer, exposing the charged layer, eliminating an electric charge from the exposed part to form an electric latent image, applying a colored, electrically charged, fine powder called "toner" to the latent image to visualize said image (development step), transferring a visible image thus obtained onto a transfer material such as a transfer paper (transferring step) and permanently fixing the image by heating, by applying a pressure or by another suitable fixing means (fixing step) as described in the specifications of U.S. Pat. Nos. 2,297,691 and 2,357,809.

Thus, the toner must have functions satisfying the requirements in not only the developing step but also the transferring and fixing steps.

Generally, the toner is deteriorated in the course of producing several thousand to several ten thousand copies, since it is mechanically abraded by a shearing force and impact force during the mechanical operation in the developing device. Though the deterioration of the toner can be prevented by using a tough resin having a high molecular weight sufficient for resisting the mechanical abrading force, such a resin has generally a high softening point and a poor thermal efficiency in a non-contact fixing method such as an oven fixing method or a radiant fixing method with I.R. rays and, therefore, the fixing cannot be effected sufficiently. Even in a heat roller fixing method employed widely in virtue of its high thermal efficiency in a contact fixing system, problems are posed that when the temperature of the heat roller is elevated so as to effect the fixing sufficiently, the fixing device is damaged, the paper is curled and the energy consumption is increased. In addition, said resin exhibits a quite low production efficiency in the production of the toner owing to fine pulverization thereof. Thus, a binder resin having an excessively high degree of polymerization or softening point cannot be used. On the other hand, the heat roller fixing method is employed widely ranging from low to high speed systems because of its extremely high thermal efficiency, since the surface of the heat roller is in contact with the toner image surface of the sheet to be fixed under pressure. However, in the step of contacting the surface of the heat roller with the toner image surface, the toner adheres frequently to the surface of the heat roller to be transferred onto the next transfer paper. This phenomenon is called "offset phenomenon". To prevent this phenomenon, the surface of the heat roller is treated with a material having excellent releasing properties such as a fluororesin. Further, the offset phenomenon is prevented completely by applying a releasing agent such as silicone oil to the surface of the heat roller.

However, the application of silicone oil is not preferred, since a large fixing device is required to elevate the cost and to complicate the operation, thereby causing troubles.

Another process for preventing the offset phenomenon comprises broadening the width of distribution of the molecular weight of the binder resin as disclosed in the specifications of Japanese Patent Publication No. 6895/1980 and Laid-Open No. 98202/1981. In this process, however, the degree of polymerization of the resin is high and a high fixing temperature is necessitated.

Another improved process for preventing the offset phenomenon comprises unsymmetrizing and crosslinking the resin as disclosed in the specifications of Japanese Patent Publication No. 493/1982 and Laid-Open Nos. 44836/1975 and 37353/1982. However, the problem of the fixing point cannot be solved by this process.

Since the lowest fixing temperature lies between a cold offset temperature and a hot offset temperature, the serviceable temperature zone ranges from the lowest fixing temperature and the hot offset temperature. Therefore, by lowering the lowest fixing temperature as far as possible and elevating the lowest hot offset temperature as far as possible, the practical fixing temperature can be lowered and the serviceable temperature zone can be widened to save the energy, to elevate the fixing speed and to prevent the curling of the paper. Further, double copy can be obtained without causing any trouble, thus inviting merits such as rendering a copier intelligent, increasing the accuracy of the temperature control of the fixing device and widening of the latitude.

Therefore, resins and toners having excellent fixability and offset resistance are demanded generally.

Polyester and styrene resins are used as said resins usually. Though the styrene resin is preferred from the economical viewpoint, it has essentially a high lowest fixing temperature and the improvement thereof by modifying the resin composition or addition of wax is limited. The present invention satisfies the above-mentioned requirements. An object of the invention is to provide a binder resin for developers capable of preventing the offset without necessitating the application of an offset-preventing liquid in the heat roller fixing process and also capable of effecting the fixing at a lower fixing temperature.

Another object of the invention is to provide a binder resin for developers capable of preventing the offset without necessitating the application of an offset inhibitor in the heat roller fixing process and also capable of effecting the fixing at a lower fixing temperature.

Still another object of the invention is to provide a binder resin for developers which has a high fluidity and a long life (resistance to deterioration) and is free from the blocking.

A further object of the invention is to provide a binder resin for developers which exhibits excellent kneadability and crushability in the preparation of the developers.

SUMMARY OF THE INVENTION

A resin according to the invention is novel and produced by the step of polymerizing (a) styrene and/or a derivative thereof, (b) a monomer component selected, alone or in combination of two or more, from the group consisting of methacrylic acid, acrylic acid, a methacrylic ester and an acrylic ester, and (c) 0.05 to 10 percent by weight, based on the total weight of the monomers, of a polybasic acid having 7 to 40 carbon atoms, an anhydride thereof or a lower (C1 to C6) alkyl ester thereof, the monomer component (b) containing at least one acrylic or methacrylic ester having hydroxyl or epoxy group in at least equimolar amount to the component (c).

The polybasic acid (c) to use in the invention has the formula below defined.

The invention also provides a resin which has been obtained by the process as above shown and has a softening point of 100° to 160° C. and a glass transition temperature of 50° C. or higher.

The invention further provides a toner composition which comprises as a binder resin the resin as above shown and a colorant.

In other words, the invention process is defined as process for producing a binder resin by polymerizing (a) styrene and/or its derivative with (b) one or more monomers selected from the group consisting of methacrylic acid, acrylic acid and esters of them, characterized in that (c) a dibasic or a higher basic carboxylic acid having 7 to 40 carbon atoms is involved in the reaction, the monomer(s) (b) contain(s) at least one acrylic or methacrylic ester having a hydroxyl or epoxy group in an amount at least equimolar to that of the component (c) and the amount of the component (c) is 0.05 to 10 wt.% based on the total amount of the monomers.

In the resin of the present invention used as an electrophotographic toner, it is preferred that the compound (c) is an acid of the following general formula:

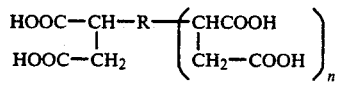

wherein R represents an alkyl, alkylene alkenylene or alkenyl group having 5 to 30 carbon atoms and at least one side chain having 3 or more carbon atoms, and n is an integer of 0 or 1, or its anhydride or lower alkyl ester.

The resin used as the electrophotographic toner has preferably limited physical properties, i.e. a softening point of 100° to 160° C as determined with a Koka type flow tester and a glass transition temperature of at least 50° C.

In the process of the present invention, the component (c) may be reacted with the component (b) prior to the polymerization, or it may be reacted with a polymer obtained from the components (a) and (b), or it may be incorporated in the polymerization system.

In the polymerization according to the present invention, well-known vinyl polymerization proceeds in the presence of a polymerization initiator such as a peroxide or azo compound. The reaction conditions are selected suitably depending on the monomers and initiator used.

Examples of the styrene or its derivatives (a) herein include styrene per se, o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene.

Examples of the methacrylic acid, acrylic acid and their esters (b) include acrylic acid per se; methyl, ethyl, n-propyl, isopropyl, n-butyl, isobutyl, tert-butyl, amyl, cyclohexyl, n-octyl, isooctyl, decyl, lauryl, 2-ethylhexyl, stearyl, methoxyethyl, 2-hydroxyethyl, hydroxypropyl, glycidyl, 2-chloroethyl and phenyl acrylates; methyl α-chloroacrylate; methacrylic acid; methyl, ethyl, n-propyl, isopropyl, n-butyl, isobutyl, tert-butyl, amyl, cyclohexyl, n-octyl, isooctyl, decyl, lauryl, 2-ethylhexyl, stearyl, methoxyethyl, 2-hydroxyethyl, hydroxypropyl, glycidyl, phenyl, dimethylaminoethyl and diethylaminoethyl methacrylates.

The compounds (c) can be obtained easily by any known process such as a reaction of a dibasic unsaturated carboxylic acid, e.g. maleic acid, with an unsaturated hydrocarbon followed, if necessary, by hydrogenation. The unsaturated dibasic carboxylic acids constituting the compounds (c) include, for example, isobutenyl-, n-dodecenyl-, isododecenyl-, n-octyl-, isooctenyl-, isobutyl-, n-dodecyl-, isododecyl-, n-octyl- and isooctylsuccinic acids as well as their anhydrides and lower alkyl esters. The tetrabasic carboxylic acids include, for example, the following compounds:

(1) 4-neopentylidenyl-1,2,6,7-heptanetetracarboxylic acid, (2) 4-neopentyl-1,2,6,7-heptene(4)-tetracarboxylic acid, (3) 3-methyl-4-heptenyl-1,2,5,6-hexanetetracarboxylic acid, (4) 3-methyl-3-heptyl-5-methyl-1,2,6,7-heptene(4)-tetracarboxylic acid, (5) 3-nonyl-4-methylidenyl-1,2,5,6-hexanetetracarboxylic acid, (6) 3-decylidenyl-1,2,5,6-hexanetetracarboxylic acid, (7) 3-nonyl-1,2,6,7-heptene(4)-tetracarboxylic acid, (8) 3-decenyl-1,2,5,6-hexanetetracarboxylic acid, (9) 3-butyl-3-ethylenyl-1,2,5,6-hexanetetracarboxylic acid,

(10) 3-methyl-4-butylidenyl-1,2,6,7-heptanetetracarboxylic acid,

(11) 3-methyl-4-butyl-1,2,6,7-heptene(4)-tetracarboxylic acid, and

(12) 3-methyl-5-octyl-1,2,6,7-heptene(4)-tetracarboxylic acid.

These compounds have the following structural formulae which are shown in the form of acid anhydrides for convenience' sake.

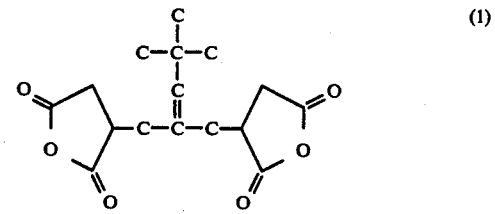

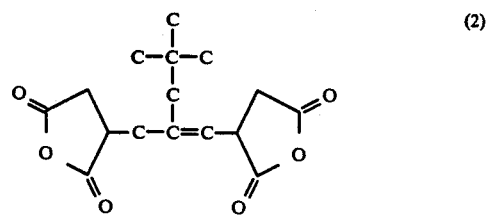

-continued

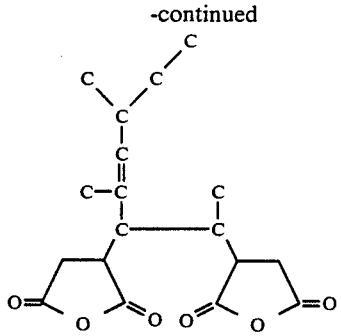
(3)

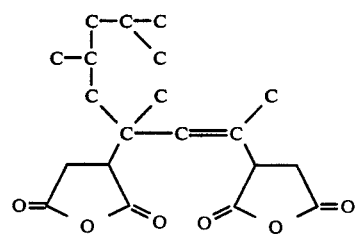
(4)

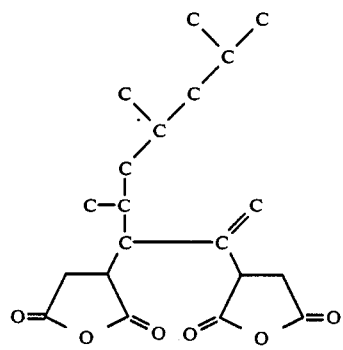
(5)

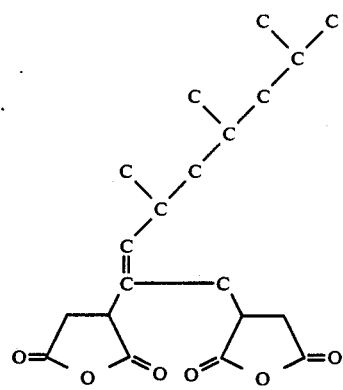
(6)

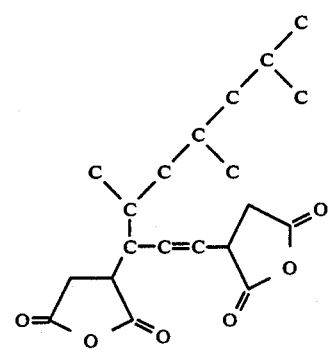
(7)

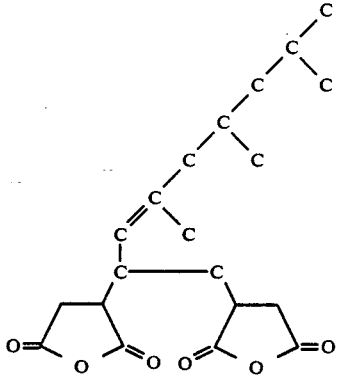
(8)

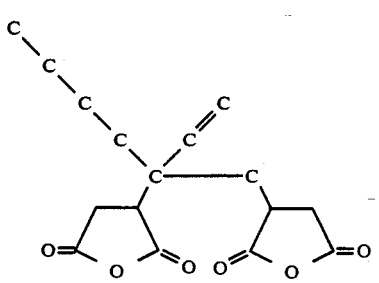
(9)

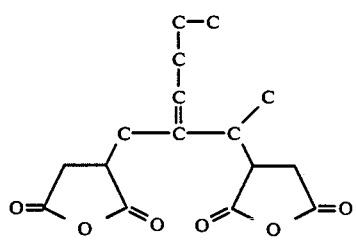
(10)

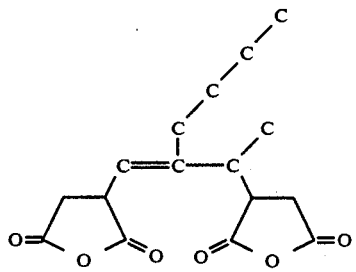
(11)

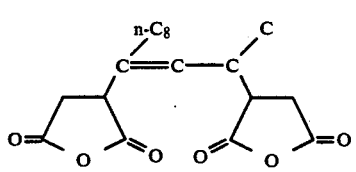
(12)

The styrene or its derivative (a) constituting the binder resin according to the present invention forms the principal skeleton of the resin. The methacrylic or acrylic acid or its ester (b) acts to control the thermal properties such as softening point of the resin, to determine the electric charge and to control the quantity of electric charge. The compound (c) acts to lower the fixing temperature and to improve the offset resistance. When the amount of the compound (c) is less than 0.05 wt.% based on the copolymer components, the fixability cannot be improved, while when it exceeds 10 wt.%, the storage stability of the toner is reduced.

The softening point of the resin of the present invention is preferably 100° to 160° C as determined with a Koka type flow tester. When the softening point is below said range, the offset resistance is insufficient, while when it is above said range, the fixability is insufficient.

The binder resin of the present invention can be prepared by known addition polymerization.

Colorants to be used together with the binder resin of the present invention to form a developer include carbon black, acetylene black, Phthalocyanine Blue, Permanent Brown FG, Brilliant Fast Scarlet, Pigment Green B, Rhodamine B Base, Solvent Red 49, Solvent Red 146, Solvent Blue 35 and mixtures of them. Usually, these colorants are used in an amount of 1 to 15 parts by weight for 100 parts by weight of the binder resin.

In preparing a magnetic toner using the binder resin of the present invention, an alloy or compound containing a ferromagnetic element, such as ferrite or magnetite, may be used as the magnetic component. The magnetic component in the form of a fine powder having an average particle diameter of 0.1 to 1$\mu$ is dispersed in the binder resin in an amount of 40 to 70 wt.%.

Though there have been known modifiers for toners, such as electric charge controllers, offset preventing agents and fluidizing agents, these additives are unnecessary or the amounts of them are reduced even when they are used in the preparation of the toner, since the resin per se of the present invention has excellent properties.

EXAMPLES

The following examples will further illustrate the present invention, which by no means limit the invention. In the examples, the amounts are given by parts by weight.

EXAMPLE 1

500 parts of xylene, 27 parts of isododecylsuccinic acid and 11.5 parts of 2-hydroxyethyl acrylate were placed in a reactor provided with a stirrer, nitrogen-inlet tube, thermometer, reflux condenser and dropping funnel. The temperature was controlled to 80° C. and the mixture was stirred at that temperature in nitrogen stream for 1 h. A liquid mixture of 820 parts of styrene, 130 parts of 2-ethylhexyl acrylate, 11.5 parts of 2-hydroxyethyl acrylate and 10 parts of benzoyl peroxide was added dropwise thereto in nitrogen stream over 4 h to carry out polymerization. After completion of the addition followed by aging at that temperature for 10 h, the pressure was reduced to 2 mmHg while the temperature was slowly elevated to 210° C. to distill off xylene. The resulting molten resin was taken in a stainless steel vat, left to cool and pulverized to obtain a powdery resin having a softening point of 125.2° C. as determined with a Koka type flow tester and Tg of 60.3° C. In the determination of the softening point with a Koka type flow tester (a product of Shimadzu Seisakusho), a load of 20 kg/cm$^2$ was applied to 1 cm$^3$ of the sample by means of a plunger to extrude the same through a nozzle having a diameter of 1 mm and a length of 1 mm under heating at a rate of 6° C./min. A curve showing the relationship between the volume realized by the lowering of the plunger in the flow tester and the temperature was drawn. The curve was S-shaped. A temperature corresponding to a half of the height (h) of this curve, i.e. h/2, was taken as the softening point.

93 parts of the resin was mixed with 7 parts of carbon black (Regal 400 R; a product of Cabot Co.) in a ball mill. The mixture was kneaded by a conventional method and then allowed to cool down. It was roughly pulverized in a hammer mill and then pulverized to fine particles in a jet mill. After classification about particle sizes, a toner having an average particle diameter of 13.5$\mu$ was obtained. The toner was mixed with a powdery iron carrier (EFV 200/300; a product of Nihon Teppun Co.) and its quantity of electric charge was measured with a blow off meter to reveal that it was $-19$ $\mu$c/g.

91 g of the toner was mixed with 1209 g of the powdery iron carrier to prepare a developer. An image was formed with a commercially available electrophotographic copier by using amorphous selenium as the photosensitizer and a fixing roller having a diameter of 60 mm and a rotation rate of 255 mm/sec (the temperature of the heat roller in the fixing device being variable and an oil application device being removed). The obtained image was clear and free from stain, blot or dropout in the solid part.

The fixability and offset resistance of the image were examined at a fixing temperature controlled to 140° to 220° C. The fixing could be effected sufficiently at 145° C. and no hot offset was observed. After forming 50,000 sheets of the image, the clear image could still be obtained without fogging or dropout in the solid part.

The lowest fixing temperature was determined herein by applying a load of 500 g to a sand rubber eraser having a bottom surface area of 15 mm $\times$ 7.5 mm, rubbing an image fixed by passing through a fixing machine to make 5 roundtrips and measuring the optical reflective density before and after the rubbing with a reflection densitometer (a product of Macbeth Co.) to determine the temperature of the fixing roller at which the fixing rate according to the following formula is above 70%:

$$\text{fixing rate} = \frac{\text{image density after rubbing}}{\text{image density before rubbing}}$$

EXAMPLE 2

500 parts of xylene, 20 parts of 3-decenyl-1,2,5,6-hexanetetracarboxylic acid and 6 parts of 2-hydroxyethyl methacrylate were placed in the same reactor as in Example 1. The temperature was controlled to 80° C. and the mixture was stirred at that temperature in nitrogen stream for 1 h. A liquid mixture of 890 parts of $\alpha$-methylstyrene, 74 parts of butyl acrylate, 10 parts of 2-hydroxyethyl methacrylate and 15 parts of lauroyl peroxide was added dropwise thereto in nitrogen stream over 4 h. After completion of the addition followed by aging at that temperature for 10 h, the pressure was reduced to 2 mmHg while the temperature was slowly elevated to 210° C. to distill off xylene. The resulting molten resin was taken in a stainless steel vat, left to cool and pulverized to obtain a powdery resin having a softening point of 121.0° C. as determined with a Koka type flow tester and Tg of 61.2° C.

93 parts of the resin was mixed with 7 parts of carbon black (Regal 400 R; a product of Cabot Co.) in a ball mill and then kneaded by a conventional method. After cooling, pulverization and classification, a toner having an average particle diameter of 13.3$\mu$ was obtained, which had a quantity of electric charge of $-21$ $\mu$c/g.

91 g of the toner was mixed with 1209 g of the powdery iron carrier to prepare a developer. An image was formed with the same copier as in Example 1. The obtained image was clear and free from stain, blot or dropout in the solid part. The fixability and offset resistance of the image were examined at a controlled fixing temperature in the fixing device. The fixing could be effected at 150° C. and no hot offset was observed. After forming 50,000 sheets of the image, the clear image could still be obtained without fogging or dropout in the solid part.

EXAMPLE 3

A powdery resin having a softening point of 26.4° C. as determined with a Koka type flow tester and Tg of 63.1° C. was obtained from 500 parts of xylene, 30 parts of isododecenylsuccinic acid, 15 parts of glycidyl methacrylate, 780 parts of styrene, parts of methyl methacrylate, 140 parts of butyl acrylate and 20 parts of $\alpha,\alpha'$-azobisdimethylvaleronitrile in the same manner as in Example 1 and in the same device as in Example 1.

93 parts of the resin was mixed with 7 parts of carbon black (Regal 400 R; a product of Cabot Co.) in a ball mill and then kneaded by a conventional method. After cooling, pulverization and classification, a toner having an average particle diameter of $12.9\mu$ was obtained, which had a quantity of electric charge of $-18$ $\mu c/g$.

91 g of the toner was mixed with 1209 g of the powdery iron carrier to prepare a developer. An image was formed with the same copier as in Example 1. The obtained image was clear and free from stain, blot or dropout in the solid part. The fixability and offset resistance of the image were examined at a controlled fixing temperature in the fixing device. The fixing could be effected at 146° C. and no hot offset was observed. After forming 50,000 sheets of the image, the clear image could still be obtained without fogging or dropout in the solid part.

EXAMPLE 4

A powdery resin having a softening point of 124.5° C. as determined with a Koka type flow tester and Tg of 60.5° C. was obtained from 500 parts of xylene, 40 parts of octylsuccinic acid, 820 parts of styrene, 20 parts of dimethylaminoethyl methacrylate, 20 parts of glycidyl methacrylate, 100 parts of lauryl methacrylate and 15 parts of $\alpha,\alpha'$-azobisisobutyrobitrile in the same manner as in Example 1 and in the same device as in Example 1.

93 parts of the resin was mixed with 7 parts of carbon black (Regal 400 R; a product of Cabot Co.) in a ball mill and then kneaded by a conventional method. After cooling, pulverization and classification, a toner having an average particle diameter of $13.0\mu$ was obtained, the quantity of electric charge of which was $+20$ $\mu c/g$.

91 g of the toner was mixed with 1209 g of the powdery iron carrier to prepare a developer. An image was formed with a commercially available electrophotographic copier by using an organic photosensitizer and a fixing roller having a diameter of 60 mm and a rotation rate of 255 mm/sec (the temperature of the heat roller in the fixing device being variable and an oil application device being removed). The obtained image was clear and free from stain, blot or dropout in the solid part. The fixability and offset resistance of the image were examined at a controlled fixing temperature in the fixing device. The fixing could be effected at 149° C. and no hot offset was observed. After forming 50,000 sheets of the image, the clear image could still be obtained without fogging or dropout in the solid part.

COMPARATIVE EXAMPLE 1

A liquid mixture of 830 parts of styrene, 170 parts of 2-ethylhexyl acrylate and 15 parts of benzoyl peroxide was added dropwise to 500 parts of xylene in the same reactor as in Example 1 at 80° C. over 4 h. After aging at that temperature for 10 h, xylene was distilled off and the residue was pulverized in the same manner as in Example 1 to obtain a powdery resin having a softening point of 130.5° C. as determined with a Koka type flow tester and Tg of 62.0° C. A toner (quantity of electric charge: $-18$ $\mu c/g$) was prepared from this resin in the same manner as in Example 1 and an image was formed with the same copier as in Example 1. The obtained image was clear and free from stain, blot or dropout in the solid part. The fixability and offset resistance of the image were examined at a controlled fixing temperature of 140° to 220° C. in the fixing device. The fixing could be effected at 175° C. but offset was observed in the entire temperature range of 140° to 220° C.

COMPARATIVE EXAMPLE 2

A liquid mixture of 850 parts of styrene, 140 parts of n-butyl acrylate, 15 parts of divinylbenzene and 15 parts of lauroyl peroxide was added dropwise to 500 parts of xylene in the same reactor as in Example 1 at 80° C. over 4 h. After going at that temperature for 10 h, xylene was distilled off and the residue was pulverized in the same manner as in Example 1 to obtain a powdery resin having a softening point of 131.0° C. as determined with a Koka type flow tester and Tg of 62.2° C. A toner (quantity of electric charge: $-18$ $\mu c/g$) was prepared from this resin in the same manner as in Example 1. A developer prepared as above was used for the image formation with the same copier as in Example 1. The obtained image was clear and free from stain, blot or dropout in the solid part. The fixability and offset resistance of the image were examined at a controlled fixing temperature in the fixing device. The fixing temperature was as high as 195° C., though no hot offset was observed in the entire temperature range of 140° to 220° C.

The embodiments of the invention in which an exclusive property or privilege is claimed are defined as follows:

1. A toner composition which possesses good fixation and no offset which contains a resin binder comprising:
   a polymerized product of (a) styrene and/or a derivative thereof,
   (b) a monomer component of at least one member selected from the group consisting of methacrylic acid, acrylic acid, a methacrylic ester, and an acrylic ester, and
   (c) 0.05 to 10 percent by weight, based on the total weight of the monomers, of a polybasic acid having 7 to 40 carbon atoms, or an anhydride thereof or a lower alkyl ester thereof having from 1 to 6 carbon atoms, said polybasic acid having the formula:

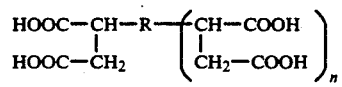

wherein R represents an alkyl, alkylene, alkenylene or alkenyl group having 4 to 30 branched or straight chain carbon atoms and n is 0 or 1, and said monomer component (b) contains at least one acrylic or methacrylic ester having hydroxyl or epoxy groups in at least equimolor amounts with respect to component (c); and a colorant thereof.

2. The toner composition of claim 1 further containing a magnetic component comprising an alloy or compound containing a ferromagnetic element, said magnetic component being in the form of a fine powder having an average particle size of 0.1 to 1µ and dispersed in the binder resin in an amount of from 40 to 70 wt%.

3. The toner composition of claim 1 in which said resin binder has a softening point of 100° to 160° C. and a glass transition temperature of 50° C. or higher.

4. The toner composition of claim 1, wherein said component (c) is reacted with said component (b) prior to said polymerization.

5. The toner composition of claim 1, wherein said component (c) is reacted with a polymer obtained from said components (a) and (b).

6. The toner composition of claim 1, wherein said component (c) is incorporated in said polymerized product.

* * * * *